The reaction can be carried out in the presence of a suitable solvent such as, for example, hexane, octane, benzene, xylene, toluene, butanol and the like. Some of the solvents can advantageously be used as azeotropic agents in the removal of the water of reaction.

A fourth object of the present invention is a method for preparing Compounds C corresponding to the formula

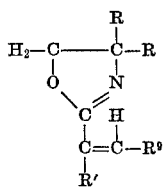

wherein R is a radical selected from the group consisting of —CH$_2$OH, lower alkyl having 1 up to about 3 carbon atoms and —CH$_2$OOCR$^2$; R$^2$ is a radical selected from the group consisting of alkyl having 1 up to about 22 carbon atoms and fluoroalkyl having 1 up to about 22 carbon atoms; R′ is a radical selected from the group consisting of alkyl having 1 up to about 21 carbon atoms and fluoroalkyl having 1 up to about 21 carbon atoms wherein not less than 75% of the hydrogen atoms have been replaced by fluorine atoms, and wherein at least 2 of the hydrogen atoms on at least one terminal carbon atom have been replaced by fluorine atoms with the proviso that when R′ is an alkyl radical at least one of the substituents designated R is the radical —CH$_2$OOCR$^2$ and the substituent R$^2$ is a fluoroalkyl radical having 1 up to about 22 carbon atoms wherein not less than 75% of the hydrogen atoms have been replaced by fluorine atoms, and wherein at least 2 of the hydrogen atoms on at least one terminal carbon atom have been replaced by fluorine atoms; and R$^9$ is a radical selected from the group consisting of hydrogen, alkyl and aryl.

In accordance with the method of the fourth object of this invention for manufacturing Compounds C an organic carbonyl compound having 1 up to about 15 carbon atoms of the formula R$^9$—CHO wherein R$^9$ is aryl, alkyl or hydrogen, as for example, formaldehyde, benzaldehyde, acetaldehyde, butyraldehyde and the like is reacted with an oxazoline having the formula

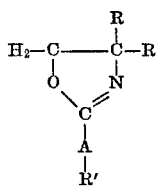

wherein R is a radical selected from the group consisting of —CH$_2$OH, lower alkyl having 1 up to about 3 carbon atoms and —CH$_2$OOCR$^2$; R$^2$ is a radical selected from the group consisting of alkyl having 1 up to about 22 carbon atoms and fluoroalkyl having 1 up to about 22 carbon atoms; R′ is a radical selected from the group consisting of alkyl having 1 up to about 21 carbon atoms and fluoroalkyl having 1 up to about 21 carbon atoms wherein not less than 75% of the hydrogen atoms have been replaced by fluorine atoms, and wherein at least 2 of the hydrogen atoms on at least one terminal carbon atom have been replaced by fluorine atoms with the proviso that when R′ is an alkyl radical at least one of the substituents designated R is the radical —CH$_2$OOCR$^2$ and the substituent R$^2$ is a fluoroalkyl radical having 1 up to about 22 carbon atoms wherein not less than 75% of the hydrogen atoms have been replaced by fluorine atoms, and wherein at least 2 of the hydrogen atoms on at least one terminal carbon atom have been replaced by fluorine atoms; and A is a divalent radical selected from the group consisting of

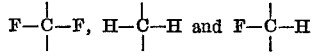

under reaction conditions to react the carbonyl group of the carbonyl compound with the α-carbon atom of the radical attached to the 2-position of the oxazoline ring.

The reaction is generally carried out at a temperature in the range of from about 60 to about 250° C., preferably from about 100 to about 190° C. and advantageously in the presence of catalytic amounts of an acidic catalyst. The amount of catalyst will depend, among other things, on the particular catalyst, the particular fluorooxazoline, the particular carbonyl compound and the temperature of reaction. The amount of catalyst generally will range from about 0.01 to about 10% and preferably from about 0.1 to about 5.0% by weight based on the weight of the fluorooxazoline.

Suitable acidic catalysts include inorganic mineral acids such as sulphuric, hydrochloric and phosphoric acids; organic carboxylic and sulphonic acids such as formic, benzenesulphonic, p-xylenesulphonic, p-toluene sulphonic, and naphthalenesulphonic acids; inorganic and organic salts such as sodium bisulphate, primary ammonium phosphate, calcium fluoride, zinc chloride, aluminum chloride, ammonium chloride, ammonium bromide, hydroxylammonium chloride, boron trifluoride and the like.

The reaction can also be carried out in the presence of solvents, for example, hydrocarbons such as hexane, octane, benzene, xylene, butanol and the like. Some of the solvents can advantageously also be used as azeotropic agents to aid in the removal of water resulting from the reaction.

In the reaction it is generally advantageous to include a polymerization inhibitor in the reaction mixture to prevent the formation of polymeric products when the monomer is desired. It is therefore desirable to use a polymerization inhibitor such as di-betanaphthol, hydroquinone, p-hydroxydiphenylamine, 2,5 - di-tert-butyl-hydroquinone, calcium carbonate and the like. The inihibitor is typically used in an amount from about 0.1 to about 10% and preferably from about 0.5 to about 5% by weight based on the weight of the fluorooxazoline.

A fifth object of the present invention is the provision of homopolymers and copolymers of Compounds C.

Compounds C can be homopolymerized and copolymerized to provide novel polymers. A wide variety of ethylenic comonomers or mixtures thereof are coppolymerizable with Compounds C, as for example, those having 2 up to about 20 carbon atoms and one or more >C=C< groups. Examples of such ethylenic comonomers include the olefins, e.g. ethylene, propylene, isobutylene; esters, e.g. methyl methacrylate, methyl acrylate, butyl methacrylate; vinyl, vinylidine halides, e.g. vinyl chloride and vinylidine chloride; vinyl carboxylates, e.g. vinyl acetate, vinyl propionate, vinyl stereate; and vinyl aryls, e.g. styrene, methyl styrene.

Compounds C are polymerizable with the aid of polymerization catalyst, for instance, a free-radical catalyst such as one or more azo-type or Redox catalyst system. Typical catalysts are azo bis(isobutyronitrile), azodiisobutyramide, dimethyl-, diethyl-, or dibutylazodiisobutyrate, and the like. One or a mixture of catalysts may be used in amounts generally of about 0.05% to 2% by weight based on the weight of monomer. Polymerization may be effected in bulk, in solution or in emulsion. The use of a Redox system is especially effective in the case of emulsion polymerization, for instance, in conjunction with peroxide catalysts such as benzoyl peroxide. Temperatures of polymerization generally range from about 0 to about 100° C. While the copolymers of the present invention are not limited to specific ratios of Compounds C to other polymerizable ethylenic monomers, the polymerization mixture typically contains in excess of 10% by weight of Compound C based on the total monomer in the mixture.

The invention will be understood more fully by reference to the following specific examples. It is understood that the examples are presented for purposes of illustration only and are not intended as a limitation of the invention.

EXAMPLE 1

2-perfluoroheptyl - 4,4 - bis(hydroxymethyl) - 2-oxazoline was prepared as follows.

To a 250 ml. round-bottom flask equipped with thermometer, stirrer, Vigreux column and electric heating means was charged 82.8 g. of perfluorooctanoic acid and 24.2 g. of tris(hydroxymethyl)aminomethane. The resulting mixture was heated with stirring over an increased temperature range of 160 to 210° C. for 2 hours.

84 g. of 2-perfluoroheptyl-4,4-bis(hydroxymethyl)-2-oxazoline was obtained.

EXAMPLE 2

2 - (1$H$, 1$H$-perfluorotridecyl) - 4 - hydroxymethyl-4-ethyl-2-oxazoline is prepared by essentially the same procedure used in Example 1 except that 2$H$, 2$H$, 3$H$, 3$H$-perfluorotetradecanoic acid is substituted for perfluorooctanoic acid and 2-amino-2-ethyl-1,3-propanediol is substituted for tris(hydroxymethyl)aminomethane.

EXAMPLE 3

2-perfluorooctyl - 4,4 - dimethyl - 2 - oxazoline is prepared by essentialy the same procedure used in Example 1 except that perfluorononanoic acid is substituted for perfluorooctanoic acid and 2-amino-2-methyl-1-propanol is substituted for tris(hydroxymethyl)aminomethane.

EXAMPLE 4

2-(8-H-perfluorooctyl) - 4,4 - bis(hydroxymethyl)-2-oxazoline is prepared by essentially the same procedure used in Example 1 except that 8 - H-perfluorononanoic acid is substituted for perfluorooctanoic acid.

EXAMPLE 5

2 - perfluoroheptyl - 4,4 - bis(perfluorooctanoyloxymethyl)-2-oxazoline was prepared as follows.

To a 250 ml. round-bottom flask equipped with stirrer, thermometer, Vigreux column, and electric heating means was charged 124.2 g. of perfluorooctanoic acid and 12.1 g. of tris(hydroxymethyl)aminomethane. The resulting mixture is heated with stirring over an increased temperature range of 160 to 240° C. for four hours.

118 g. of 2 - perfluoroheptyl - 4,4 - bis(perfluorooctanoyloxymethyl)-2-oxazoline was obtained.

EXAMPLE 6

2 - perfluoroheptyl - 4 - methyl - 4 - stearoyloxymethyl-2-oxazoline was prepared by the following procedure.

A 500 ml. flask equipped with a stirrer, thermometer, Vigreux column, and an electric heating means was charged with 82.8 g. of pentadecafluorooctanoic acid and 18.2 g. of 2-amino-2-methyl-1,3-porpanediol. The resulting mixture was heated with stirring over an increased temperature range of from 160 to 220° C. for 2 hours. The reaction mixture was then premitted to cool to about 160° C. and 56.8 g. of stearic acid was added therein. The resulting reaction mixture was then heated for an additional 2-hour period over an increased temperature range of 160 to 240° C.

2 - perfluoroheptyl - 4 - methl - 4 - stearoyloxymethyl-2-oxazoline was obtained.

EXAMPLE 7

Preparation of 2-(1 - perfluoroheptylethenyl)-4,4-dimethyl-2-oxazoline.

A mixture of 100 g. of 2-perfluoroheptyl-4,4-dimethyl-2-oxazoline and 13 g. of powdered paraformaldehyde is charged to a 500 ml. flask fitted with a sealed stirrer, thermometer, Vigreux column and electric heating means. Attached to the top of the column is a water-separator and reflux condensor. The mixture is heated to 110–120° C. for approximately 1 hour. To the heated mixture is then added 0.4 g. of hydroquinone and 50 ml. of benzene. The mixture is then heated under reflux with azeotropic removal of water at an increased temperature rang of 120–195° C. for approximately 5 hours.

2 - (1 - perfluoroheptylethenyl) - 4,4 - dimethyl-2-oxazoline is obtained.

The homopolymer of this product is obtained by essentially the same procedure except that the hydroquinone is omitted from the reaction mixture and a polymerization initiator, e.g. benzoylperoxide, is used.

EXAMPLE 8

The copolymer of 2-(1-perfluoroheptylethenyl)-4,4-dimethyl - 2 - oxazoline and methyl methacrylate is prepared by the following procedure.

A mixture of 50 grams freshly distilled methyl methacrylate, 50 grams 2-(1-perfluoroheptylethenyl) - 4,4-dimethyl-2 - oxazoline and 0.2 grams azo bis(isobutyronitrile) is heated at about 80° C. for about 24 hours under a blanket of nitrogen in a sealed container. A polymeric material is obtained.

As previously indicated, the monomers and polymers of this invention are useful for rendering fibrous materials, e.g. textiles repellent to oil, water and soil. The novel compositions of the present invention in which the substituent on the 2-position of the oxazoline ring contain 6 or more carbon atoms are preferred for this use.

The compositions of the present invention can be applied to fibrous materials from any suitable form of liquid application medium and by any suitable procedure. Conventional impregnating, padding and treating apparatus can be employed. Usually, it is convenient to apply the composition by dipping, padding or emersing. Brushing, spraying, roller-coating, electro-static coating, doctor-blade coating and like procedures may also be employed. Following application, the treated fibrous material is preferably dried and then subjected to treatment with heat, e.g. at temperatures in the range of from about 100 to 450° F. for a period of time typically in the range of from about 5 seconds to about 5 hours.

The compositions of the present invention may be applied to fibrous materials in conjunction with other agents such as for example, softening agents, dyes, emulsifiers, pigments, lubricants, moth-proofing agents, flame-proofing agents, shrink-proofing agents, sizes, brightening agents, and the like.

When the compositions of the present invention are used to provide oil and soil repellent finishes for textiles, it is preferable in order to obtain optimum durability of the finish to incorporate a thermosetting resin binder and a curing catalyst for said resin binder in the liquid application medium. Any suitable thermosetting resin binder which is compatible with the compositions of the present invention be employed. Such thermosetting resin binders are well known and many are commercially available. Examples of thermosetting resin binders which may be utilized include nitrogen-containing compounds having more than 1 reactive methylol group such as urea-formaldehyde condensation products, for example dimethylolethylene urea, dimethylol urea, dimethylol-1,3-propylene urea, dimethylol-1,3-butylene urea, dimethylol-dihydroxyethylene urea; the triazones such as 1,3-bis(hydroxymethyl)-tetrahydro-5-ethyl-2-triazones, 1,3 - bis(hydroxymethyl)-tetrahydro - 5 - propyl-2-triazone; the pyrimidinones, such as 1,3-bis(hydroxymethyl)-tetrahydro - 2 - pyrimidinone, 1,3-bis(hydroxymethyl)-tetrahydro - 5 - methyl-2-pyrimidinone, 1,3-bis(hydroxymethyl)-tetrahydro - 5 - hydroxy-2-pyrimidinone; the melamine formaldehyde condensation products, for example, dimethylolmelamine, trimethylolmelamine, hexamethylolmelamine, and the like. Further types of thermosetting resin binders are those

United States Patent Office 3,652,513
Patented Mar. 28, 1972

3,652,513
POLYMERS OF FLUOROOXAZOLINES AND
THEIR PREPARATION
Domenick Donald Gagliardi, East Greenwich, R.I., assignor to Commercial Solvents Corporation, New York, N.Y.
No Drawing. Original application Dec. 12, 1966, Ser. No. 600,713. Divided and this application Feb. 12, 1969, Ser. No. 871,151
Int. Cl. C08f 7/12
U.S. Cl. 260—80.3                   15 Claims

ABSTRACT OF THE DISCLOSURE

Polymers of compositions having the formula

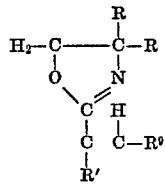

wherein R is a radical selected from the group consisting of —CH$_2$OH, lower alkyl having 1 up to about 3 carbon atoms and —CH$_2$OOCR$^2$; R$^2$ is a radical selected from the group consisting of alkyl having 1 up to about 22 carbon atoms and fluoroalkyl having 1 up to about 22 carbon atoms; R' is a radical selected from the group consisting of alkyl having 1 up to about 21 carbon atoms and fluoroalkyl having 1 up to about 21 carbon atoms wherein not less than 75% of the hydrogen atoms have been replaced by fluorine atoms and wherein at least 2 of the hydrogen atoms on at least one terminal carbon have been replaced by fluorine atoms with the provision that when R' is an alkyl radical at least one of the substituents designated R is the radical —CH$_2$OOCR$^2$ and the substituent R$^2$ is a fluoroalkyl radical having 1 up to about 22 carbon atoms wherein not less than 75% of the hydrogen atoms have been replaced by fluorine atoms and wherein at least 2 of the hydrogen atoms on at least one of the terminal carbon atoms have been replaced by fluorine atoms; and R$^9$ is a radical selected from the group consisting of hydrogen, lower alkyl, and aryl, are provided as well as methods for their preparation.

This invention relates to novel compositions. In a particular aspect this invention relates to novel fluorooxazolines, to polymers of these novel fluorooxazolines and to methods for producing said fluorooxazolines and said polymers.

The novel compositions of the present invention are useful for rendering fibrous materials, e.g. textiles repellent to oil and soil. The novel compositions of the present invention are also useful as antimicrobials and as insecticides.

One object of the present invention is the provision of novel compositions of matter of the formula

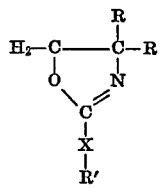

wherein R is a radical selected from the group consisting of —CH$_2$OH, lower alkyl having 1 up to about 3 carbon atoms and —CH$_2$OOCR$^2$; R$^2$ is a radical selected from the group consisting of alkyl having 1 up to about 22 carbon atoms and fluoroalkyl having 1 up to about 22 carbon atoms; R' is a radical selected from the group consisting of alkyl having from 1 up to about 21 carbon atoms and fluoroalkyl having 1 up to about 21 carbon atoms wherein not less than 75% of the hydrogen atoms have been replaced by fluorine atoms, and wherein at least 2 of the hydrogen atoms on at least one terminal carbon atom have been replaced by fluorine atoms with the proviso that when R' is an alkyl radical at least one of the substituents designated R is the radical —CH$_2$OOCR$^2$ and and the substituent R$^2$ is a fluoroalkyl radical having 1 up to about 22 carbon atoms wherein not less than 75% of the hydrogen atoms have been replaced by fluorine atoms, and wherein at least 2 of the hydrogen atoms on at least one terminal carbon atom have been replaced by fluorine atoms; and X is a divalent radical selected from the group consisting of

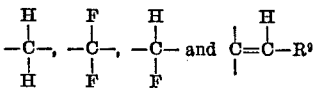

wherein R$^9$ is a radical selected from the group consisting of hydrogen, alkyl and aryl.

Included among the novel compositions of the present invention are 2-(1H,1H-perfluorododecyl)-4-hydroxymethyl-4-ethyl-2-oxazoline,
2-perfluoroheptyl-4-4-dimethyl-2-oxazoline,
2-(1H, perfluoroproply)-4,4-bis(stearoyloxymethyl)-2-oxazoline,
2-perfluorohexyl-4-stearoyloxymethyl-4-perfluoroheptanoyloxymethyl-2-oxazoline,
-(1H,1H,2H,2H-perfluoropentadecyl)-4,4-bis(hydroxymethyl)-2-oxazoline,
2-perfluoropentadecyl-4,4-bis(perfluorotetradecanoyloxymethyl)-2-oxazoline,
2-(1-perfluorohexadecylethenyl)-4,4-bis(stearoyloxymethyl)-2-oxazoline,
1-(1-perfluoropropylethnyl-4,4-bis(2H, 2H-perfluoropentanoxyloxymethyl)-2-oxazoline,
2-(1-perfluorodecylethenyl)-4,4-bis(hydroxymethyl)-2-oxazoline,
2-(1-perfluorodecyl-1-butenyl)-4-ethyl-4-hydroxymethyl-2-oxazoline,
2-heptadecyl-4,4-bis(2H,2H-perfluoropentanoyloxymethyl)-2-oxazoline,
2-nonyl-4,4-bis(perfluorotetradecanoyloxymethyl)-2-oxazoline,
2-(8H-perfluorooctyl)-4,4-bis(hydroxymethyl)-2-oxazoline,
2-octyl-4-propyl-4-(perfluoroheptanoyloxymethyl)-2-oxazoline,
2-[(1-perfluorohexadecyl-2-phenyl)pentenyl]-4-propyl-4-hydroxymethyl-2-oxazoline and the like.

A second object of the present invention is a method for preparing Compounds A having the formula

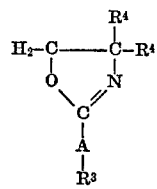

wherein R$^3$ is a fluoroalkyl radical having from 1 up to about 21 carbon atoms wherein not less than 75% of the hydrogen atoms have been replaced by fluorine atoms and wherein at least 2 of the hydrogen atoms on at least one terminal carbon atoms have been replaced by fluorine atoms; R$^4$ is a radical selected from the group consisting of —CH$_2$OH, lower alkyl having 1 up to about 3 carbon atoms and —CH$_2$OOCR$^5$, R$^5$ is a fluoroalkyl radical having from about 3 to about 22 carbon atoms wherein not less than 75% of the hydrogen atoms have been replaced by fluorine atoms, and wherein at least 2 of the hydrogen atoms on at least one terminal carbon atom have been replaced by fluorine atoms; and A is a divalent radical selected from the group consisting of

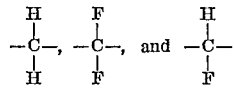

In accordance with the method of the second object of this invention for manufacturing Compounds A, an amino alcohol of the formula

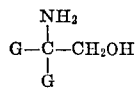

wherein G is a radical selected from the group consisting of lower alkyl having from 1 up to about 3 carbon atoms and —CH$_2$OH is reacted with a fluoroalkylmonocarboxylic acid having from about 3 to about 23 carbon atoms wherein not less than 75% of the hydrogen atoms have been replaced by fluorine atoms, and wherein at least 2 of the hydrogen atoms on at least one terminal carbon atom have been replaced by fluorine atoms. The reaction is carried out under condensation conditions.

Among the amino alcohols which may be employed in producing Compounds A are 2-amino-2-methyl-1-propanol, 2-amino-2-ethyl-1,3-propanediol, 2-amino-2-methyl - 1,3 - propanediol, tris(hydroxymethyl)aminomethane and the like. Among the fluoroalkylmonocarboxylic acids useable in producing Compounds A are 2H, 2H, perfluorooctanoic acid, perfluoroctanoic acid, 2H, 2H, 3H, 3H, perfluorodecanoic acid, perfluorohexanoic acid and the like. Such amino alcohols and such fluoroalkylmonocarboxylic acids are commercially available.

The reaction is generally carried out by heating a mixture of amino alcohol and fluoroalkylmonocarboxylic acid at a temperature in the range of from about 100 to about 250° C. and preferably from about 160 to about 240° C.

The reaction may be carried out in the presence of a suitable solvent. Such solvents include hexane, octane, benzene, xylene, toluene, butanol, etc. Some of the solvents can advantageously also be used as azeotropic agents to aid in the removal of the water of reaction.

A third object of the present invention is a method for preparing Compounds B having the following formula

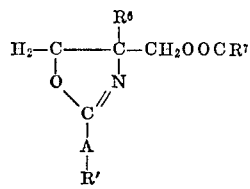

wherein R$^6$ is a radical selected from the group consisting of —CH$_2$OH, lower alkyl having 1 up to about 3 carbon atoms and —CH$_2$OOCR$^8$; R$^7$ is a radical selected from the group consisting of alkyl having 1 up to about 22 carbon atoms and fluoroalkyl having 1 up to about 22 carbon atoms with the proviso that the R$^7$ substituent is a different radical than the R' substituent; R$^8$ is a radical selected from the group consisting of alkyl having 1 up to about 22 carbon atoms and fluoroalkyl having 1 up to about 22 carbon atoms; R' is a radical selected from the group consisting of alkyl having 1 up to about 21 carbon atoms and fluoroalkyl having 1 up to about 21 carbon atoms wherein not less than 75% of the hydrogen atoms have been replaced by fluorine atoms, and wherein at least 2 of the hydrogen atoms on at least one terminal carbon atom have been replaced by fluorine atoms with the proviso that when R' is an alkyl radical the substituent designated R$^7$ is a fluoroalkyl radical having 1 up to about 22 carbon atoms wherein not less than 75% of the hydrogen atoms have been replaced by fluorine atoms, and wherein at least 2 of the hydrogen atoms on at least one terminal carbon atom have been replaced by fluorine; and A is a divalent radical selected from the group consisting of

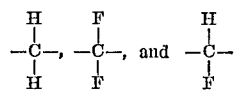

In accordance with the method of the third object of this invention for manufacturing Compounds B, there is provided a reaction mixture consisting essentially of a polyhydroxyamino alcohol of the formula

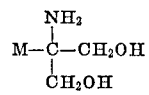

wherein M is a radical selected from the group consisting of lower alkyl having from 1 up to about 3 carbon atoms and —CH$_2$OH and an acid selected from the group consisting of a fluoroalkylmonocarboxylic acid having from about 3 to about 3 carbon atoms wherein not less than 75% of the hydrogen atoms have been replaced by fluorine atoms, and wherein at least 2 of the hydrogen atoms on at least one terminal carbon atom have been replaced by fluorine atoms and an alkyl radical having from 3 to about 23 carbon atoms in a molar ratio of acid to alcohol of in the range of about 1:1 to about 2:1; the said amino alcohol and said acid are then reacted under condensation conditions until from about 2 to about 3 mole equivlents of water are separated, then an acid selected from the group consisting of monocarboxylic acid having from 2 up to about 23 carbon atoms, as for example stearic acid, octanoic acid, dodecanoic acid and the like, and fluoroalkylmonocarboxylic acid having from 2 up to about 23 carbon atoms with the proviso that the said acid is a different acid than the acid initially employed is added to the reaction mixture and the reaction mixture is heated until from 1 to about 2 additional mole equivalents of water are separated. The 2-step reaction is illustrated by the following equation where Z represents a fluoroalkyl radical and Y an alkyl radical

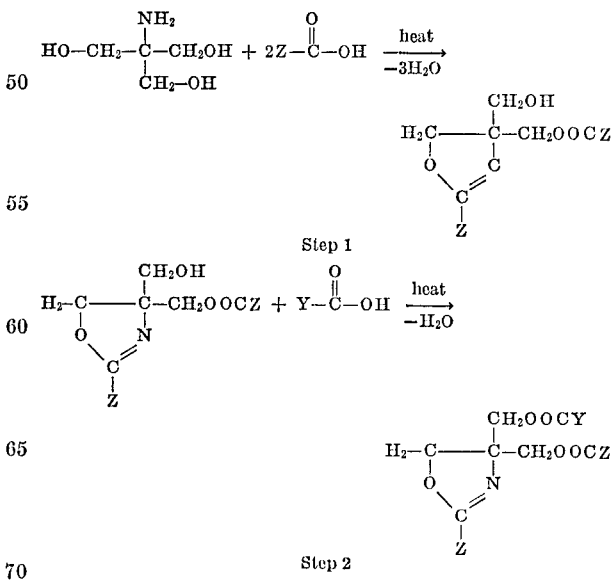

Each step of the two-step reaction is generally carried out under condensation conditions at a temperature in the range of from about 100 to about 250° C. and preferably from about 160 to about 240° C.

having more than 1 functional aziridinyl group, for example, tris(aziridinyl)-phosphine oxide, tris(aziridinyl)-phosphine sulfide, carbonyl bis-aziridine, N,N'-bis(ethyleneiminoformyl)ethylenediamine and the like. Additional types of thermosetting resin binders are the dialdehydes and the polymeric acetals. Further types of thermosetting resin binders are the epoxides having more than one functional group, for example, 1,3-diglycidylglycerol, the diglycidylether of ethylene glycol, vinyl butadiene diepoxide and the like. Mixtures of the foregoing thermosetting resin binders may also be utilized.

Any suitable curing catalyst which is compatible with the compositions of the present invention may be employed. Examples of such curing catalysts include zirconyl chloride, magnesium chloride, ammonium chloride, zinc nitrate, 2-amino-2-methyl-1-propanol hydrochloride, 2-amino - 2 - ethyl-1,3-propanediol hydrochloride and the like.

The examples which follow demonstrate the effectiveness of compositions of the present invention in imparting oil repellency to textiles.

EXAMPLES 9

A padding bath was prepared by dispersing 2 parts by weight of 2 - perfluoroheptyl-4,4-bis(hydroxymethyl)-2-oxazoline prepared in accordance with the procedure of Example 1 in 98 parts by weight of water. Pieces of cotton fabric were padded with this bath and were dried for 5 minutes at 250° F. and then cured for 5 minutes at 300° F. The resulting pieces of fabric were oil repellent.

EXAMPLE 10

A padding bath was prepared containing 2 parts 2-perfluoroheptyl-4,4-bis(hydroxymethyl)-2-oxazoline 5 parts dimethylolmelamine, 1 part zinc nitrate (50% aqueous solution) and 92 parts water. Pieces of cotton fabric were padded with this bath and were dried for 5 minutes at 250° F. and cured at 300° F. for 5 minutes. The resulting pieces of fabric were oil repellent.

The fabrics obtained from Examples 9 and 10 were tested for oil repellency. The oil repellency was determined in accordance with the test described in Minnesota Mining & Manufacturing Company, Textile Chemical Bulletin, Appendix A—January, 1962, p. 1 and referred to as the 3M Oil Repellency Test. The test is based on the different penetrating properties of two hydrocarbon liquids, namely, mineral oil and n-heptane. The mineral oil and n-heptane proportions for each rating were selected to give oil stain resistance ratings comparable to spray ratings of American Association of Textile Colorists and Chemists (AATCC) Test 22—1952. Samples of the fabric were dry cleaned with perchloroethylene before testing. Samples of untreated cotton fabrics were also tested and served as a control. The results of the test on the fabrics are given in Table I.

TABLE I

| Example No. | Oil rating | |
|---|---|---|
| | Initial | Dry cleaned |
| Control | 0 | 0 |
| 9 | 100+ | 50 |
| 10 | 100+ | 100+ |

The above test shows the effectiveness of compositions of the present invention in imparting oil repellent finishes to fibrous materials.

Since many embodiments may be made in this invention and since many changes may be made in the embodiments described, the foregoing is to be interpreted as illustrative only and the invention is defined by the claims appended hereto.

It is claimed:

1. Homopolymers of compositions having the formula

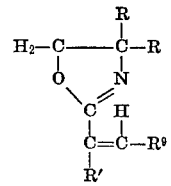

wherein R is a radical selected from the group consisting of —$CH_2OH$, lower alkyl having 1 up to about 3 carbon atoms and —$CH_2OOCR^2$; $R^2$ is a radical selected from the group consisting of alkyl having 1 up to about 22 carbon atoms and fluoroalkyl having 1 up to about 22 carbon atoms; R' is a radical selected from the group consisting of alkyl having 1 up to about 21 carbon atoms and fluoroalkyl having 1 up to about 21 carbon atoms wherein not less than 75% of the hydrogen atoms have been replaced by fluorine atoms and wherein at least 2 of the hydrogen atoms on at least one terminal carbon atom have been replaced by fluorine atoms with the proviso that when R' is an alkyl radical at least one of the substituents designated R is the radical —$CH_2OOCR^2$ and the substituent $R^2$ is a fluoroalkyl radical having 1 up to about 22 carbon atoms wherein not less than 75% of the hydrogen atoms have been replaced by fluorine atoms and wherein at least 2 of the hydrogen atoms on at least one of the terminal carbon atoms have been replaced by fluorine atoms; and $R^9$ is a radical selected from the group consisting of hydrogen, lower alkyl and aryl.

2. The homopolymer of claim 1 wherein $R^9$ is hydrogen.

3. A method for preparing a homopolymer of a composition of the formula

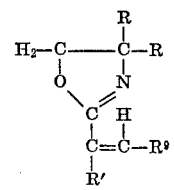

wherein R is a radical selected from the group consisting of —$CH_2OH$, lower alkyl having 1 up to about 3 carbon atoms and —$CH_2OOCR^2$; $R^2$ is a radical selected from the group consisting of alkyl having 1 up to about 22 carbon atoms and fluoroalkyl having 1 up to about 22 carbon atoms; R' is a radical selected from the group consisting of alkyl having 1 up to about 21 carbon atoms and fluoroalkyl having 1 up to about 21 carbon atoms wherein not less thtn 75% of the hydrogen atoms have been replaced by fluorine atoms, and wherein at least 2 of the hydrogen atoms on at least one terminal carbon atom have been replaced by fluorine atoms with the proviso that when R' is an alkyl radical at least one of the substituents designated R is the radical —$CH_2OOCR^2$ and the substituent $R^2$ is a fluoroalkyl radical having 1 up to about 22 carbon atoms wherein not less than 75% of the hydrogen atoms have been replaced by fluorine atoms, and wherein at least 2 of the hydrogen atoms on at least one of the terminal carbon atoms have been replaced by fluorine atoms; and $R^9$ is a radical selected from the group consisting of hydrogen, lower alkyl and aryl which comprises polymerizing the composition under polymerization conditions.

4. A copolymer of a compound containing from 2 up to about 20 carbon atoms and having at least one >C=C< group and in excess of 10% by weight of a composition of the formula

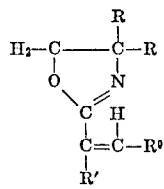

wherein R is a radical selected from the group consisting of —CH₂OH, lower alkyl having 1 up to about 3 carbon atoms and —CH₂OOCR²; R² is a radical selected from the group consisting of alkyl having 1 up to about 22 carbon atoms and fluoroalkyl having 1 up to about 22 carbon atoms; R' is a radical selected from the group consisting of alkyl having 1 up to about 21 carbon atoms and fluoroalkyl having 1 up to about 21 carbon atoms wherein not less than 75% of the hydrogen atoms have been replaced by fluorine atoms and wherein at least 2 of the hydrogen atoms on at least one terminal carbon atom have been replaced by fluorine atoms with the proviso that when R' is an alkyl radical at least one of the substituents designated R is the radical —CH₂OOCR² and the substituent R² is a fluoroalkyl radical having 1 up to about 22 carbon atoms wherein not less than 75% of the hydrogen atoms have been replaced by fluorine atoms, and wherein at least 2 of the hydrogen atoms on at least one terminal carbon atom have been replaced by fluorine atoms; and R⁹ is a radical selected from the group consisting of hydrogen, lower alkyl and aryl.

5. A method for copolymerizing polymerizable amounts of a composition of the formula

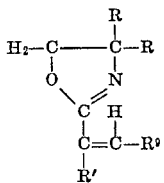

wherein R is a radical selected from the group consisting of —CH₂OH, lower alkyl having 1 up to about 3 carbon atoms and —CH₂OOCR²; R² is a radical selected from the group consisting of alkyl having 1 up to about 22 carbon atoms and fluoroalkyl having 1 up to about 22 carbon atoms; R' is a radical selected from the group consisting of alkyl having 1 up to about 21 carbon atoms and fluoroalkyl having 1 up to about 21 carbon atoms wherein not less than 75% of the hydrogen atoms have been replaced by fluorine atoms and wherein at least 2 of the hydrogen atoms on at least one terminal carbon atom have been replaced by fluorine atoms with the proviso that when R' is an alkyl radical at least one of the substituents designated R is the radical —CH₂OOCR² and the substituent R² is a fluoroalkyl radical having 1 up to about 22 carbon atoms wherein not less than 75% of the hydrogen atoms have been replaced by fluorine atoms and wherein at least 2 of the hydrogen atoms on at least one of the terminal carbon atoms have been replaced by fluorine atoms; and R⁹ is a radical selected from the group consisting of hydrogen, lower alkyl and aryl which comprises polymerizing in excess of 10% by weight of the composition under polymerization conditions with a compound containing from 2 up to about 20 carbon atoms and having at least one >C=C< group.

6. The homopolymers of claim 1 wherein R' is a fluoroalkyl radical.

7. The homopolymers of claim 6 wherein R⁹ is hydrogen.

8. The homopolymers of claim 6 wherein R⁹ is aryl.

9. The method of claim 3 wherein R' is a fluoroalkyl radical.

10. The method of claim 9 wherein R⁹ is hydrogen.

11. The copolymers of claim 4 wherein R' is a fluoroalkyl radical.

12. The copolymers of claim 11 wherein R⁹ is hydrogen.

13. The copolymers of claim 11 wherein R⁹ is aryl.

14. The method of claim 5 wherein R' is a fluoroalkyl radical.

15. The method of claim 14 wherein R⁹ is hydrogen.

References Cited
UNITED STATES PATENTS

| | | | |
|---|---|---|---|
| 2,960,508 | 11/1960 | Croxall et al. | 260—88.3 |
| 3,509,235 | 4/1970 | Riemhofer et al. | 260—88.3 |

HARRY WONG. JR., Primary Examiner

U.S. Cl. X.R.

117—140; 260—80.72, 85.7, 86.1, 87.5, 87.7, 88.1, 88.3 307; 424—78, 81, 272